United States Patent
Gilbert et al.

(10) Patent No.: US 11,257,364 B2
(45) Date of Patent: Feb. 22, 2022

(54) SYSTEMS AND APPARATUSES FOR IMPROVING LAW ENFORCEMENT INTERACTIONS WITH THE PUBLIC

(71) Applicant: University of Florida Research Foundation, Incorporated, Gainesville, FL (US)

(72) Inventors: Juan Eugene Gilbert, Gainesville, FL (US); Jessica N. Jones, Waldorf, MD (US); Isabel Laurenceau, Gainesville, FL (US); Michelle Emamdie, St. Augustine, FL (US); DeKita Moon, Smyrna, GA (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 373 days.

(21) Appl. No.: 16/463,021

(22) PCT Filed: Dec. 11, 2017

(86) PCT No.: PCT/IB2017/057803
§ 371 (c)(1),
(2) Date: May 22, 2019

(87) PCT Pub. No.: WO2018/109645
PCT Pub. Date: Jun. 21, 2018

(65) Prior Publication Data
US 2019/0318618 A1    Oct. 17, 2019

Related U.S. Application Data

(60) Provisional application No. 62/432,939, filed on Dec. 12, 2016.

(51) Int. Cl.
*G08G 1/017* (2006.01)
*H04W 4/46* (2018.01)
(Continued)

(52) U.S. Cl.
CPC ........... *G08G 1/017* (2013.01); *G06Q 20/102* (2013.01); *G06Q 50/182* (2013.01); *G06Q 50/26* (2013.01); *H04W 4/46* (2018.02)

(58) Field of Classification Search
CPC ...... G08G 1/017; G06Q 50/26; G06Q 50/182; G06Q 20/102; H04W 4/46
See application file for complete search history.

(56) References Cited

U.S. PATENT DOCUMENTS 8,243,140 B1 * 8/2012 Howe ............... G08G 1/0175
 348/149
8,898,805 B2    11/2014 Pacella et al.
(Continued)

OTHER PUBLICATIONS

International Searching Authority, International Search Report and Written Opinion for PCT Application No. PCT/IB2017/057803, dated Mar. 26, 2018, pp. 1-23.

*Primary Examiner* — Ramsey Refai
(74) *Attorney, Agent, or Firm* — Alston & Bird LLP

(57) ABSTRACT

Apparatuses, methods, and systems disclosed herein that improve the safety and enhance the quality of interactions between law enforcement officers and drivers. In one example embodiment, a method is provided in which, during a traffic stop, a first device associated with an officer's vehicle obtains information about a driver's vehicle, queries a database for network address information associated with a driver device associated with the driver's vehicle, and receives the network address information from the database. The first device may then transmit a connection request to the second device using the received network address information; and a connection may be established between the two devices. This connection may comprise a videoconference, a teleconference, or even a text chat feature, enabling the officer and the driver to communicate from their respective vehicles, thus avoiding the face-to-face and tension- (Continued)

filled in-person interaction that has previously been a necessary risk involved in traffic stops.

14 Claims, 13 Drawing Sheets

(51) Int. Cl.
*G06Q 20/10* (2012.01)
*G06Q 50/18* (2012.01)
*G06Q 50/26* (2012.01)

(56) References Cited

U.S. PATENT DOCUMENTS

| | | | |
|---|---|---|---|
| 10,769,865 B2 | 9/2020 | Thorpe | |
| 11,010,922 B1* | 5/2021 | Gingrich | G06T 7/246 |
| 2003/0055701 A1* | 3/2003 | Dutta | G06Q 30/0284 |
| | | | 705/1.1 |
| 2003/0200227 A1 | 10/2003 | Ressler | |
| 2008/0042815 A1 | 2/2008 | Breed et al. | |
| 2008/0238719 A1* | 10/2008 | Marchasin | G08G 1/017 |
| | | | 340/901 |
| 2010/0085418 A1* | 4/2010 | Sampsel | H04N 21/4788 |
| | | | 348/14.08 |
| 2011/0121991 A1* | 5/2011 | Basir | G08G 1/09671 |
| | | | 340/902 |
| 2012/0116661 A1 | 5/2012 | Mizrachi | |
| 2013/0144469 A1 | 6/2013 | Ricci | |
| 2014/0310031 A1 | 10/2014 | Ricci | |
| 2014/0368601 A1 | 12/2014 | deCharms | |
| 2015/0312400 A1* | 10/2015 | Hansen | G06K 9/00536 |
| | | | 455/414.1 |
| 2016/0163011 A1* | 6/2016 | Zimmerman | G06Q 50/265 |
| | | | 705/325 |
| 2016/0294831 A1 | 10/2016 | Borunda et al. | |
| 2017/0164178 A1* | 6/2017 | Anjum | G06K 9/209 |
| 2018/0222059 A1* | 8/2018 | Ragula | G05D 1/0038 |

* cited by examiner

SYSTEMS AND APPARATUSES FOR IMPROVING LAW ENFORCEMENT INTERACTIONS WITH THE PUBLIC

CROSS REFERENCE TO RELATED APPLICATIONS

This application is a National Stage Application, filed under 35 U.S.C. § 371, of International Application No. PCT/IB2017/057803, filed Dec. 11, 2017, which claims the benefit of U.S. Provisional Patent Application Ser. No. 62/432,939, filed Dec. 12, 2016, which is incorporated herein by reference in its entirety, including any figures, tables, and drawings.

TECHNOLOGICAL FIELD

The present invention relates to wireless device-based communication, and more specifically, to utilizing virtual connections facilitated by user devices to enable new types of interpersonal exchanges between law enforcement and the public.

BACKGROUND

There have been too many incidents with tragic consequences between law enforcement officers and civilians. During numerous traffic stops, the ability of law enforcement officers and civilians to effectively communicate with one another is often critical to the safety of both the law enforcement officers and civilians. However, in many cases, traffic stops are particularly anxiety-inducing for law enforcement officers and civilians alike such that observed behaviors by one party during a physical interaction can be easily misinterpreted as threatening by another. Such misinterpretations can lead to unwarranted escalations of violence. Given the risk presented by close physical interactions between law enforcement officers and civilians in situations such as traffic stops, there is an unmet need to reduce both the anxiety caused by such physical interactions and the likelihood for needless escalations of violence.

At the same time, the inventors have discovered other latent and unmet needs stemming from the nature of the officer-driver interaction, which has not materially changed in many years. The traditional interaction involves a manual transfer of paper documentation from the driver to the officer, which requires first that the driver possess the documentation, and which in any event requires the manual evaluation of the driver's documentation by the officer. Participation by third parties, which may otherwise alleviate this burden, is traditionally impossible, as the third party would need to be present at the scene. However, the inventors have identified that third parties could in many instances improve officer-driver interactions if technology made such participation possible. Thus, there remains an unmet need for a solution that can avoid the reliance on slow and error-prone manual steps and that enables third parties to improve the officer-driver interaction.

As described in detail below, the inventors have developed a versatile system for meeting the above needs—as well as others—by adding improvements to the devices already possessed by both law enforcement and the majority of drivers today.

BRIEF SUMMARY

Apparatuses, methods, and systems disclosed herein improve both the safety of high-stress interactions between law enforcement and civilians, and also enhance the quality of those interactions by using new technologies that can bring new resources to bear and materially alter the nature of these interactions for the better. Fundamentally, example embodiments described herein rely on the fact that mobile telephony has become a ubiquitous feature of society, and both law enforcement officers and drivers now typically utilize network-connected devices in the majority of instances. Accordingly, example embodiments facilitate replacement of in-person, face-to-face confrontations during traffic stops with virtual connections between officers and drivers. By enabling virtual connectivity, third parties can be introduced into the encounter to facilitate communication, evaluate driver documentation, and potentially advise one or both parties regarding proper protocol and/or decorum during such interactions.

In example embodiments, various methods, apparatuses, and systems are provided that facilitate improved interaction between law enforcement officers and drivers. For example, example embodiments involve, during a traffic stop, a first device associated with an officer's vehicle. An example method includes obtaining information about a driver's vehicle, querying a database for network address information associated with a driver device associated with the driver's vehicle, and receiving the network address information from the database. The first device may then transmit a connection request to the second device using the received network address information, and a connection may be established between the two devices. This connection may comprise a videoconference, a teleconference, or even a text chat feature, enabling the officer and the driver to communicate from their respective vehicles, thus avoiding the face-to-face and tension-filled in-person interaction that has previously been a necessary risk involved in traffic stops.

In some embodiments, obtaining the vehicle information associated with the second device may be done in one of several ways. For instance, user interface circuitry of the first device may receive input comprising the vehicle information. Alternatively, the first device may receive at least a portion of the vehicle information from a dash-cam attached to the first vehicle or an external camera located along a roadway. As yet another alternative, the first device may transmit, by a communication interface, a broadcast message requesting the vehicle information and may in turn receive at least a portion of the vehicle information from the second device in response to the broadcast message.

In some embodiments, communications circuitry of the first device may transmit an invitation to a third device to facilitate joining of a third party associated with the third device in the connection. In some embodiments, the first device may generate at least one of a citation associated with the event or a report regarding the connection, and may deliver the at least one of the citation or the report to the Bureau of Motor Vehicles.

Although described using an example method above, an apparatus associated with a first vehicle is also contemplated herein. The apparatus includes at least one processor and at least one memory comprising instructions that when executed by a processor, cause the apparatus to obtain, during an event, vehicle information associated with a second vehicle; cause querying of a database for network address information associated with a second device based on the obtained vehicle information; receive, from the database, the network address information associated with the second device; transmit a connection request to the second device using the received network address information; and establish a connection with the second device.

Similarly, an example computer program product is also contemplated herein. The computer program product includes a non-transitory computer readable storage medium comprising instructions that, when executed by a first device associated with a first vehicle, configure the first device to obtain, during an event, vehicle information associated with a second vehicle; cause querying of a database for network address information associated with a second device based on the obtained vehicle information; receive, from the database, the network address information associated with the second device; transmit a connection request to the second device using the received network address information; and establish a connection with the second device.

In yet another example embodiment, a method is provided that includes receiving, from a first device located at a first vehicle, and by a second device located at a second vehicle, a connection request during an event; determining, by the second device, that at least one additional individual should be invited to the connection; notifying at least one third party device associated with the at least one addition individual of the connection request; receiving, by a user interface of the second device, input indicating acceptance of the connection request; and in response to receiving the input indicating acceptance of the connection request, causing transmission, by the second device, of a message establishing a connection between the first device and the second device.

The method of this example embodiment also includes delivering information associated with the connection to a calendar module; transmitting, by communications circuitry, an invitation to a third party device to facilitate joining of the third party device in the connection; and enabling delivery of secure payment of a citation associated with the event to the Bureau of Motor Vehicles using e-commerce.

In accordance with yet another example embodiment, an apparatus associated with a driver device is provided that includes at least one processor and at least one memory comprising instructions that when executed by a processor, cause the apparatus to receive, from a first device located at a first vehicle, a connection request during an event; determine that at least one additional individual should be invited to the connection; notify at least one third party device associated with the at least one addition individual of the connection request; receive, by a user interface of the driver vehicle, input indicating acceptance of the connection request; and in response to receiving the input indicating acceptance of the connection request, transmit a message to the first device establishing a connection with the first device.

In accordance with yet another example embodiment, a computer program product comprising a non-transitory computer readable storage medium comprising instructions that, when executed by a driver device associated with a driver vehicle, configure the driver device to receive, from a first device located at a first vehicle, a connection request during an event; determine that at least one additional individual should be invited to the connection; notify at least one third party device associated with the at least one addition individual of the connection request; receive, by a user interface of the driver vehicle, input indicating acceptance of the connection request; and in response to receiving the input indicating acceptance of the connection request, transmit a message to the first device establishing a connection with the first device.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
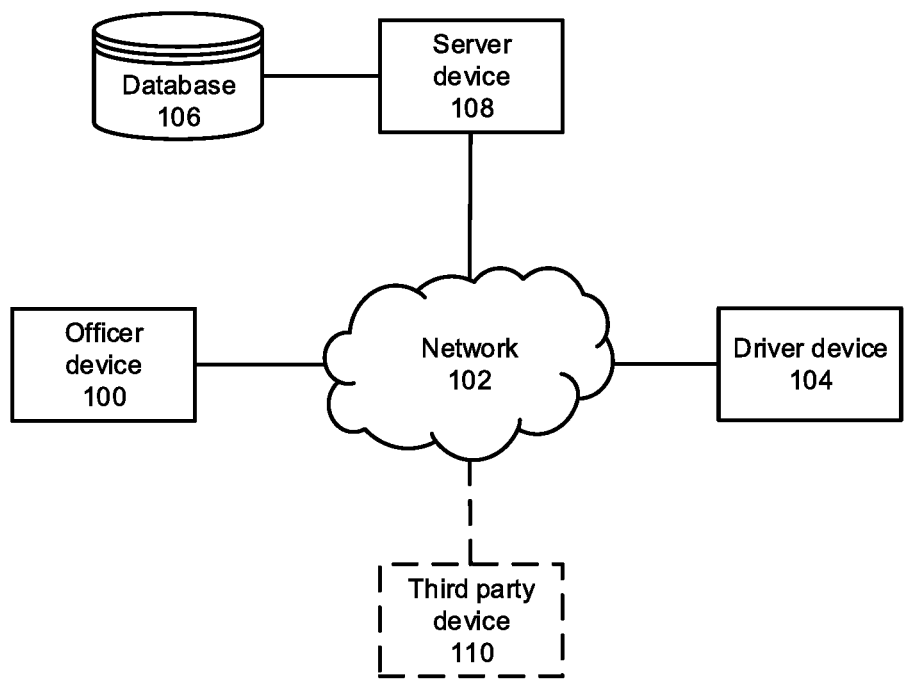
Figure 2:
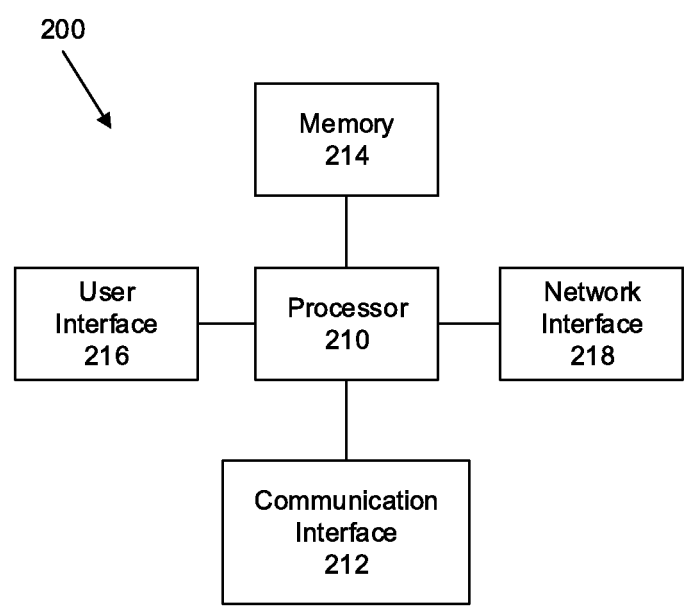
Figure 3:
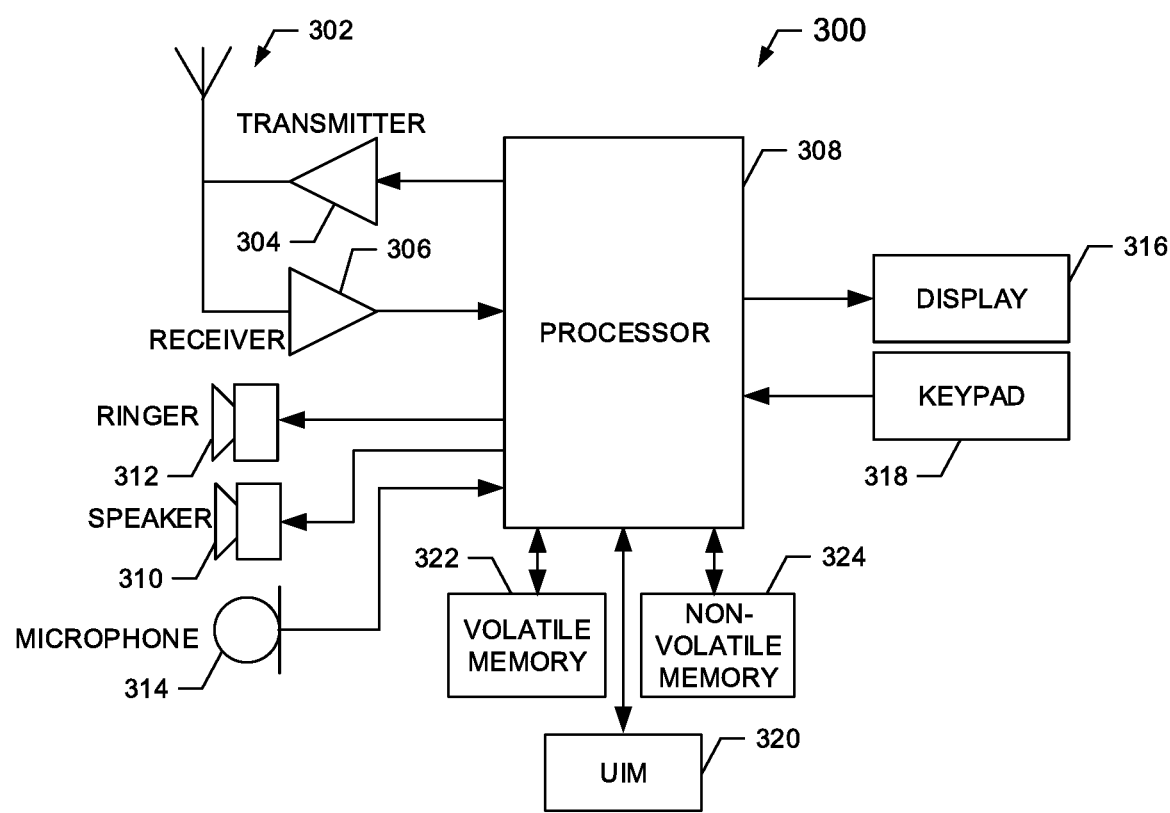
Figure 4:
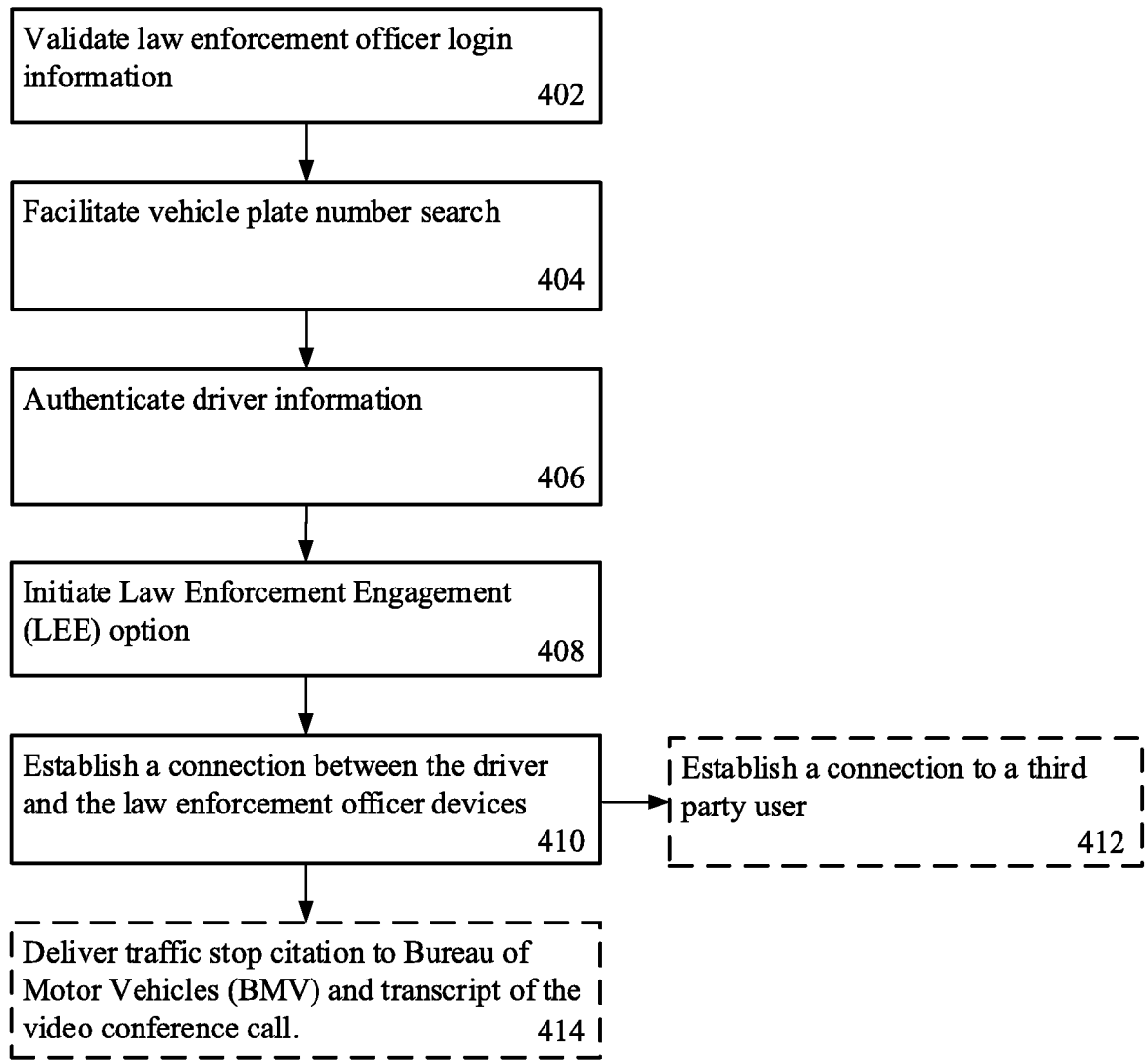
Figure 5:
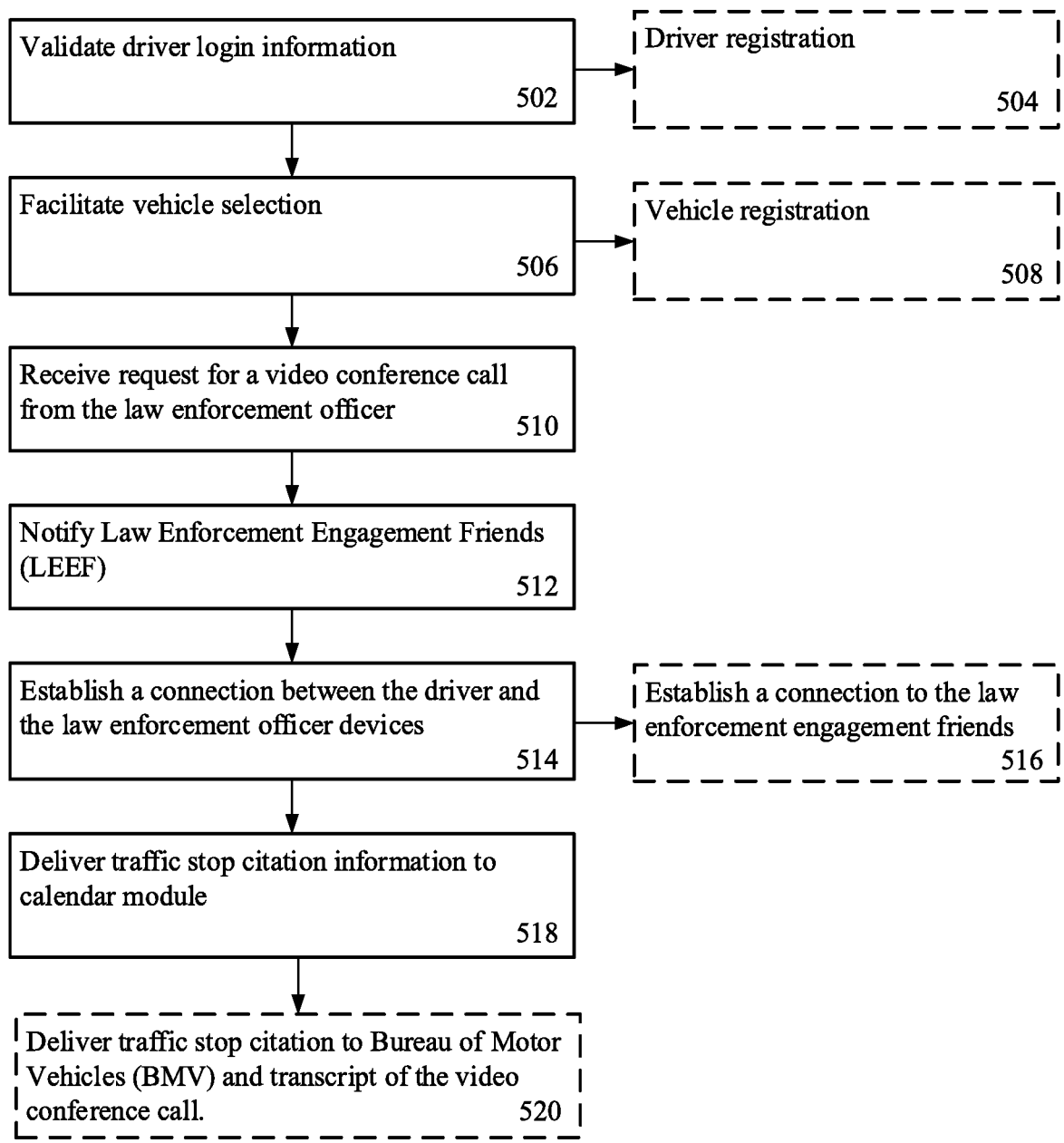

Having thus described certain example embodiments in general terms, reference will hereinafter be made to the accompanying drawings, which are not necessarily drawn to scale, and wherein:

FIG. 1 is a schematic representation of a system that may support example embodiments of the present invention;

FIG. 2 is a block diagram of an electronic device that may be configured to implement example embodiments of the present invention;

FIG. 3 is a block diagram of an mobile device that may be embodied by or associated with an electronic device, and may be configured to implement example embodiments of the present invention;

FIG. 4 is a flowchart illustrating operations performed by an officer device in accordance with example embodiments of the present invention;

FIG. 5 is a flowchart illustrating operations performed by a driver device in accordance with example embodiments of the present invention;

FIGS. 6-13B are schematic representations of user interfaces which may be displayed in accordance with example embodiments of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., one or more volatile or non-volatile memory device), can be differentiated from a "computer-readable transmission medium," which refers to an electromagnetic signal.

A method, apparatus and computer program product are provided in accordance with an example embodiment in order to provide virtual connections facilitated by user devices to enable new types of interpersonal exchanges between law enforcement and the public.

Reference is now made to FIG. 1 which illustrates an officer device connected to a network 102. A driver device 104 is also shown connected to the network 102. FIG. 1 also illustrates that in some embodiments, a third party device 110 may also be connected to the network 102. The officer device 100 and the driver device 104 may be any devices that are configured to communicate over any type of network. For example, each officer device 100 or driver device 104 may be a mobile terminal, such as a mobile telephone, PDA, pager, laptop computer, tablet computer, or any of numerous other hand held or portable communication devices, computation devices, content generation devices, content consumption devices, motor vehicles, or combinations thereof. In some embodiments, one or more of the officer device 100 and driver device 104 may comprise an onboard computer system embedded within a corresponding vehicle. In accordance with some embodiments, the officer device 100 and the driver device 104 may include or be associated with an apparatus 200, such as that shown in FIG. 2 and described below.

As shown in FIG. 1, officer device 100, driver device 104 may communicate with one another (and, optionally, with one or more third party device 110) via network 102. Network 102 may be a wireless network, such as a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a General Packet Radio Service (GPRS) network, Wi-Fi, or other type of network. When one device seeks to establish or initiate a connection request to another device, the connection may utilize network address information retrieved from a database 106, which may be hosted on a server device 108 (as shown in FIG. 1).

Contained within database 106 are user account information (e.g., username, identifier, or handle information) associated with individuals who have registered to use devices described herein, relevant network address information for the devices contemplated herein, and metadata relating to both the user accounts and to the devices. This metadata may contain network capability information (e.g., types of networks that may be utilized to establish a connection with particular devices), communication capabilities information (e.g., languages spoken by the individuals associated with particular user accounts, disabilities of those individuals that may relate to communication ability (e.g., whether an individual is deaf, has a disorder that may cause otherwise unusual-seeming behavior, or the like)), terminal capabilities information (e.g., whether the device has a video camera), other user defined criteria, and/or security information (e.g., login credential information associated with particular user accounts and/or devices). The metadata may further specify modes of communications available and/or preferred by particular devices, which may include voice communication or any combination or voice, audio, video, or text.

Because database 106 stores detailed information associated with the individuals and devices that may be connected via network 104, when a requesting device initiates a connection request, the requesting device can query database 106 for network address information and possibly other related information associated with a target vehicle, device, or individual. Network address information of a device may be provided directly to the requesting device in response to provision of identifying information gathered from the target vehicle (e.g., a vehicle plate number). In some embodiments, the requesting device may transmit a local broadcast message prompting an automated response from any nearby devices, and the device may respond with its vehicle plate number (which can then be used to query database 106) or with its network address information and other related information that may otherwise be retrieved from database 106. The requesting device then may use the network address information to establish a direct connection to the target device via a connection request. In other words, by storing descriptive information regarding the individuals and devices that may be connected in example embodiments described herein, the database 106 may in many embodiments comprise a central hub facilitating engagement between officers, drivers, and third parties.

Referring now to FIG. 2, an apparatus 200 is illustrated that may comprise officer device 100, driver device 104, and/or third party device 110. Apparatus 200 includes constituent components including, but not necessarily limited to, a processor 210, a communication interface 212, a memory 214, and a user interface 216. In some embodiments, the processor 210 (and/or co-processors or any other processing circuitry assisting or otherwise associated with the processor 210) may be in communication with memory 214. The memory 214 may include, for example, one or more volatile and/or non-volatile memories. In other words, for example, the memory 214 may be an electronic storage device (e.g., a computer readable storage medium) comprising gates configured to store data (e.g., bits) that may be retrievable by a machine (e.g., a computing device like the processor 210). In some embodiments, the memory 214 may have constituent elements 322 and 324, which are referenced below in connection with FIG. 3. The memory 214 may be configured to store information, data, content, applications, instructions, or the like, for enabling the apparatus to carry out various functions in accordance with an example embodiment of the present invention. For example, the memory 214 could be configured to buffer input data for processing by the processor 210. Additionally or alternatively, the memory 214 could be configured to store instructions for execution by the processor 210. Specifically, the memory 214 may have stored thereon a traffic stop application (or "app") that, upon execution, configures the apparatus 200 to provide the functionality described herein.

The apparatus 200 may, in some embodiments, be embodied by or associated with a mobile terminal (e.g., mobile terminal 300, which is described in greater detail below in connection with FIG. 3). In these or other embodiments, the apparatus 200 may be embodied as a chip or chip set. In other words, the apparatus 200 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 200 may therefore, in some cases, be configured to implement an embodiment of the present invention on a single chip or as a single "system on a chip." As such, in some cases, a chip or chipset may constitute means for performing one or more operations for providing the functionalities described herein.

The processor 210 may be embodied in a number of different ways. For example, the processor 210 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 50 may include one or more processing cores configured to perform independently. A multi-core processor may enable multiprocessing within a single physical package. Additionally or alternatively, the processor 210 may include one or more processors configured in tandem via a bus to enable independent execution of instructions, pipelining and/or multithreading. In embodiments in which the apparatus 200 is embodied as mobile terminal 300 shown in FIG. 3, the processor 210 may be embodied by the processor 308.

The processor 210 may be configured to execute instructions stored in the memory 214 or otherwise accessible to the processor 210. Alternatively or additionally, the processor 210 may be configured to execute hard coded functionality. As such, whether configured by hardware or software methods, or by a combination thereof, the processor 210 may represent an entity (e.g., physically embodied in circuitry) capable of performing operations described herein, and thus may be physically configured accordingly. Thus, for example, when the processor 210 is embodied as an ASIC, FPGA or the like, the processor 210 may include specifically configured hardware for conducting the operations described herein. Alternatively, as another example, when the processor 210 is embodied as an executor of software instructions, the instructions may specifically configure the processor 210 to perform the algorithms and/or operations described herein when the instructions are executed. For instance, when the processor 210 is a processor of a specific device (e.g., a mobile terminal or network entity) configured to embody one of the devices contemplated herein (e.g., officer device 100, driver device 104, server device 108, or a third party device 110) that configuration of the processor 210 occurs by instructions for performing the algorithms and/or operations described herein. The processor 210 may include, among other things, a clock, an arithmetic logic unit (ALU) and logic gates configured to support operation of the processor 210.

Meanwhile, the communication interface 212 may be any means such as a device or circuitry embodied in either hardware or a combination of hardware and software that is configured to receive and/or transmit data from/to a network, such as network 102, and/or any other device or module in communication with the apparatus 200. In this regard, the communication interface 212 may include, for example, an antenna (or multiple antennas) and supporting hardware and/or software for enabling communications with a wireless communication network. Additionally or alternatively, the communication interface 212 may include the circuitry for interacting with the antenna(s) to cause transmission of signals via the antenna(s) or to handle receipt of signals received via the antenna(s). In some environments, the communication interface 212 may alternatively or also support wired communication. As such, for example, the communication interface 212 may include a communication modem and/or other hardware/software for supporting communication via cable, digital subscriber line (DSL), universal serial bus (USB) or other mechanisms. For instance, when the apparatus 200 comprises a mobile terminal such as that shown in FIG. 3, the communication interface 212 may be embodied by the antenna 302, transmitter 304, receiver 306, or the like.

In some embodiments, such as instances in which the apparatus 200 is embodied by devices 100, 104, or 110, the apparatus 200 may include a user interface 216 that may, in turn, be in communication with the processor 210 to receive an indication of a user input and/or to cause provision of an audible, visual, mechanical or other output to the user. As such, the user interface 216 may include, for example, a keyboard, a mouse, a joystick, a display, a touch screen(s), touch areas, soft keys, a microphone, a speaker, or other input/output mechanisms. Alternatively or additionally, the processor 210 may comprise user interface circuitry configured to control at least some functions of one or more user interface elements such as, for example, a speaker, ringer, microphone, display, and/or the like. The processor 210 and/or user interface circuitry comprising the processor 210 may be configured to control one or more functions of one or more user interface elements through computer program instructions (e.g., software and/or firmware) stored on a memory accessible to the processor 210 (e.g., memory 214, and/or the like).

In some embodiments, devices 100, 104, and/or 110 may be embodied by mobile terminals. In this regard, a block diagram of an example of such a device is mobile terminal 300, illustrated in FIG. 3. It should be understood that the mobile terminal 300 is merely illustrative of one type of user device that may embody devices 100 and 104. As such, although numerous types of mobile terminals, such as PDAs, mobile telephones, pagers, mobile televisions, gaming devices, laptop computers, cameras, tablet computers, touch surfaces, wearable devices, video recorders, audio/video players, radios, electronic books, positioning devices (e.g., global positioning system (GPS) devices), or any combination of the aforementioned, may readily be used in some example embodiments, other user devices including fixed (non-mobile) electronic devices may be used in some other example embodiments.

The mobile terminal 300 may include an antenna 302 (or multiple antennas) in operable communication with a transmitter 304 and a receiver 306. The mobile terminal 300 may further include an apparatus, such as a processor 308 or other processing device (e.g., processor 50 of the apparatus of FIG. 3), which controls the provision of signals to, and the receipt of signals from, the transmitter 304 and receiver 306, respectively. The signals may include signaling information in accordance with the air interface standard of an applicable cellular system, and also user speech, received data and/or user generated data. In this regard, the mobile terminal 300 is capable of operating with one or more air interface standards, communication protocols, modulation types, and access types. By way of illustration, the mobile terminal 300 is capable of operating in accordance with wireless communication mechanisms. For example, mobile terminal 300 may be capable of communicating in a wireless local area network (WLAN) or other communication networks, for example in accordance with one or more of the IEEE 802.11 family of standards, such as 802.11a, b, g, or n. As an alternative (or additionally), the mobile terminal 300 may be capable of operating in accordance with any of a number of first, second, third and/or fourth-generation cellular communication protocols or the like. For example, the mobile terminal 300 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as evolved UMTS Terrestrial Radio Access Network (E-UTRAN), with fourth-generation (4G) wireless communication protocols (e.g., Long Term Evolution (LTE) or LTE-Advanced (LTE-A) or the like.

In some embodiments, the processor 308 may include circuitry desirable for implementing audio and logic functions of the mobile terminal 300. For example, the processor 308 may be comprised of a digital signal processor device, a microprocessor device, and various analog to digital converters, digital to analog converters, and other support circuits. Control and signal processing functions of the mobile terminal 300 are allocated between these devices according to their respective capabilities. The processor 308 thus may also include the functionality to convolutionally encode and interleave message and data prior to modulation and transmission. The processor 308 may additionally include an internal voice coder, and may include an internal data modem. Further, the processor 308 may include functionality to operate one or more software programs, which may be stored in memory. For example, the processor 308 may be capable of operating a connectivity program, such as a conventional Web browser. The connectivity program may then allow the mobile terminal 300 to transmit and receive Web content, such as location-based content and/or other web page content, according to a Wireless Application Protocol (WAP), Hypertext Transfer Protocol (HTTP) and/or the like, for example.

The mobile terminal 300 may also comprise a user interface including an output device such as a conventional earphone or speaker 310, a ringer 312, a microphone 314, a display 316, and a user input interface, all of which are coupled to the processor 308. The user input interface, which allows the mobile terminal 300 to receive data, may include any of a number of devices allowing the mobile terminal 300 to receive data, such as a keypad 318, a touch screen display (display 316 providing an example of such a touch screen display) or other input device. In embodiments including the keypad 318, the keypad 318 may include the conventional numeric (0-9) and related keys (#, *), and other hard and soft keys used for operating the mobile terminal 25. Alternatively or additionally, the keypad 318 may include a conventional QWERTY keypad arrangement. The keypad 318 may also include various soft keys with associated functions. In addition, or alternatively, the mobile terminal 300 may include an interface device such as a joystick or other user input interface. Some embodiments employing a touch screen display, as described further below, may omit the keypad 318 and any or all of the speaker 310, ringer 312, and microphone 314 entirely. The mobile terminal 300 further includes a battery, such as a vibrating battery pack, for powering various circuits that are required to operate the mobile terminal 300, as well as optionally providing mechanical vibration as a detectable output.

The mobile terminal 300 may further include a user identity module (UIM) 320. The UIM 320 is typically a memory device having a processor built in. The UIM 320 may include, for example, a subscriber identity module (SIM), a universal integrated circuit card (UICC), a universal subscriber identity module (USIM), a removable user identity module (R-UIM), etc. The UIM 320 typically stores information elements related to a mobile subscriber. In addition to the UIM 320, the mobile terminal 300 may be equipped with memory. For example, the mobile terminal 300 may include volatile memory 322, such as volatile Random Access Memory (RAM) including a cache area for the temporary storage of data. The mobile terminal 300 may also include other non-volatile memory 324, which may be embedded and/or may be removable. The memories may store any of a number of pieces of information, and data, used by the mobile terminal 200 to implement the functions of the mobile terminal 300.

Figure 6:
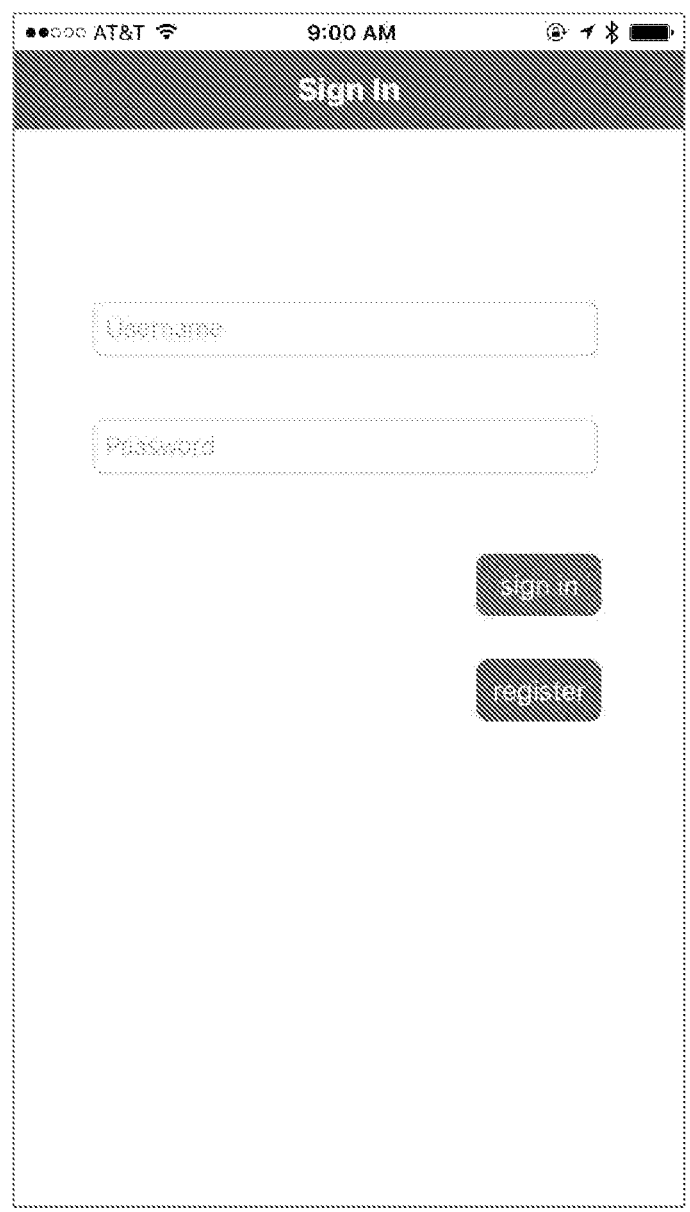

Thus, turning now to FIG. 4, the operations facilitating use of an officer device 100 will now be described. One primary context in which the following operations may be useful is in a traffic stop (e.g., where an officer has pulled over a vehicle). In this regard and as described below, the operations of FIG. 4 may be performed by an apparatus 200, such as shown in FIG. 2, which may comprise a mobile station 300, as described in greater detail in FIG. 3. In this regard, the apparatus 200 may include means, such as a processor 210, memory 214, communication interface 212, and/or user interface 216 for executing operations described herein. As an initial matter, the apparatus 200 may present, via user interface 216, an interface soliciting login information. In response, the apparatus 200 may receive a username and password via the user interface 216 and may then transmit this login information, via communication interface 212, to the server device 108. The server device 108 then validates the received username and password (block 402), either by delivering an error message to the officer device 100, thus prompting another opportunity to login, or by permitting the officer device 100 to access various operations designed for use by law enforcement personnel. FIG. 6 shows an exemplary login screen in accordance with block 402. Input boxes are available for a username and password, which when entered may be checked against a database (e.g., database 106) accessible to the server device 108 to authenticate the officer device 100. Once the login information has been validated, the database 106 may be updated to indicate that the officer is currently utilizing officer device 100. It will be understood that in some embodiments, the login procedure may utilize heightened security measures, such as two-factor authentication, biometric identification, or the like to reduce the likelihood that unauthorized parties can access the functionality described herein. It will further be understood that this login information may in some embodiments be provided once, and that subsequent uses of the officer device 100 will not require repeated performance of the login procedure.

Moreover, in addition to receiving user-identifying information, the officer device 100 may further require entry of vehicle identification information, such as for situations where the officer device 100 can be associated with multiple vehicles. For instance, although an officer may traditionally utilize a particular vehicle, it may be the case that the officer will utilize a different vehicle from time to time, and in such situations, it is thus important for the officer to be able to identify the vehicle that will be utilized in connection with the mobile app. In such embodiments, the vehicle identifying information can be provided to the officer device 100 during the login procedure, although in other embodiments, the vehicle identifying information may be retrieved automatically by the officer device 100 through wireless interrogation of a computer embedded in the vehicle (e.g., a telematics unit or proprietary computing infrastructure installed in the vehicle) or through wired connection to an on-board diagnostics port of the vehicle. In yet further embodiments, the vehicle identifying information may be gathered from a transmitter deposited in the vehicle for this identification purpose. Of course, it will be understood that in embodiments in which the officer device 100 is itself an on-board computer of the vehicle, additional entry of vehicle identification information would be unnecessary. Once the vehicle being used in connection with officer device 100 is confirmed, the server device 108 may update database 106 to indicate that the officer is currently utilizing officer device 100 in connection with the identified vehicle. This real-time utilization information can thereafter be queried by other devices (e.g., driver device 104 and/or third party device(s) 110) that have access to the database 106 to confirm the officer identification in future interactions between the officer device 100 and these other devices. As described below in connection with FIG. 5, validation of driver login information may be performed in a similar fashion, thus resulting in an up-to-date record connecting each driver to a corresponding driver device 104 and a particular vehicle being utilized by that driver. It will further be understood that validation of third party device login information can be performed in a similar way, and that such validation may also cause updating of database 106 to store an up-to-date record of which devices are being used by those third parties, which ensures that third parties can be reached via network address information of the devices that they are most likely to have available at any given time (e.g., by a smartphone, tablet, or laptop when traveling, a fixed terminal or phone line when at an office, or the like).

Figure 7:
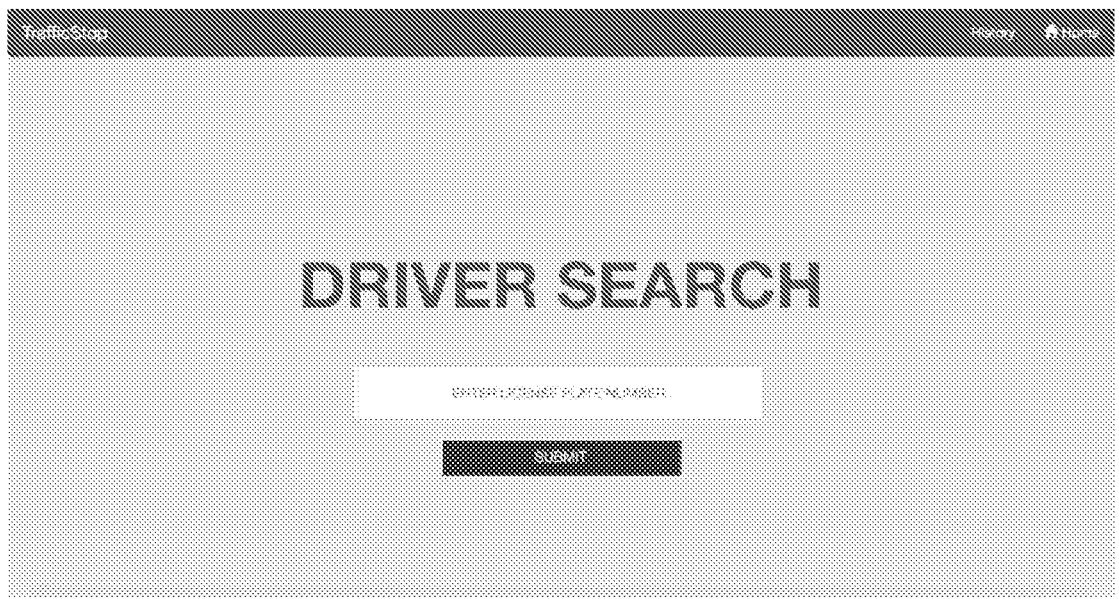

Returning to the specific operations of the driver device 100, however, it will be understood that upon validation of login information, the officer device 100 provides a series of possible procedures to the officer. One of these procedures is to initiate a request to facilitate vehicle plate number search (block 404). FIG. 7 shows an exemplary search screen in accordance with block 404. As noted above, a typical context in which this procedure may be useful is at a traffic stop in which the officer has pulled over a vehicle. The officer may enter the vehicle plate number of the pulled-over vehicle using the apparatus 200, after which the apparatus 200 may submit the vehicle plate number to server 108.

It will be understood that although the vehicle plate number may be manually entered into graphical user interface 216 of the officer device 100, the vehicle plate number may alternatively be gathered via other methods as well. For instance, the apparatus 200 may request video from a dash-cam associated with the officer's vehicle, and may analyze the dash-cam video to identify the vehicle plate number. Using basic computer vision technology and/or various barcode systems, a dash-cam or any other camera on a computing device could automatically read a vehicle plate number without manual entry. Alternatively, the apparatus 200 may utilize direct communications between the officer device 100 and a driver device 104 to gather the vehicle plate number. For instance, the apparatus 200 may send a broadcast message via communication interface 212 requesting vehicle plate information from any nearby driver devices 104. The broadcast message may utilize a short range communication protocol (e.g., Bluetooth) which will thus be received only by nearby devices and which will prompt a return communication comprising a vehicle plate number associated with each driver device 104 receiving the broadcast message.

However the vehicle plate number is retrieved, in some embodiments the apparatus 200 may deliver a prompt to the officer via user interface 216 requesting verification of the vehicle plate number. For instance, the apparatus 200 may transmit, via communication interface 212, the vehicle plate number to server device 108, which may in turn collect year, make, model, engine (YMME) and/or color information associated with the vehicle plate number, and may return such information to the apparatus 200 for display to the officer via user interface 216. Based on the returned information and a visual evaluation of the pulled-over vehicle, the officer may then confirm validity of the vehicle plate number via the user interface 216. When multiple vehicle plate numbers are received from a broadcast message, the officer may utilize the user interface 216 to select which of the vehicles corresponds to the vehicle that was pulled-over. In this fashion, the process of identifying pulled-over vehicle may be streamlined, thus reducing the effort required of the officer as well as increasing the reliability of the vehicle identification process.

Having confirmed the identity of the vehicle that was pulled-over, the apparatus 200 may transmit the vehicle plate number, via communication interface 212, to the server device 108 for retrieval of information associated with the pulled-over vehicle. Specifically, in response to transmission of the vehicle plate number to the server device 108, the server device 108 may then authenticate the driver information (block 406). To do this, the server device 108 may query database 106 to identify the driver associated with the vehicle, as well as the driver device 104 used by that driver. Thereafter, the server device 108 may query database 106 for information connected with the identified vehicle, which may comprise registration and insurance information associated with the vehicle as well as the license information for the vehicle owner and any drivers who may have user accounts connected to the vehicle. If the database 106 does not itself store up-to-date license, insurance, and/or registration information, the server device 108 may send the vehicle plate number to a registration system which may be for example, a law enforcement database of the relevant Bureau of Motor Vehicles (BMV), an insurance database, a governmental database, and/or a digital identification database. In addition to gathering relevant documentation related to the vehicle, the server device 108 may thereafter automatically determine whether the gathered information is in proper order or may transmit the gathered information to the officer device 100 for manual evaluation. The server device 108 may further transmit to the officer device 100 driver information related to the vehicle, such as information providing an identity of the driver of the vehicle and network address information relating to a driver device 104 associated with the driver.

Figure 8:
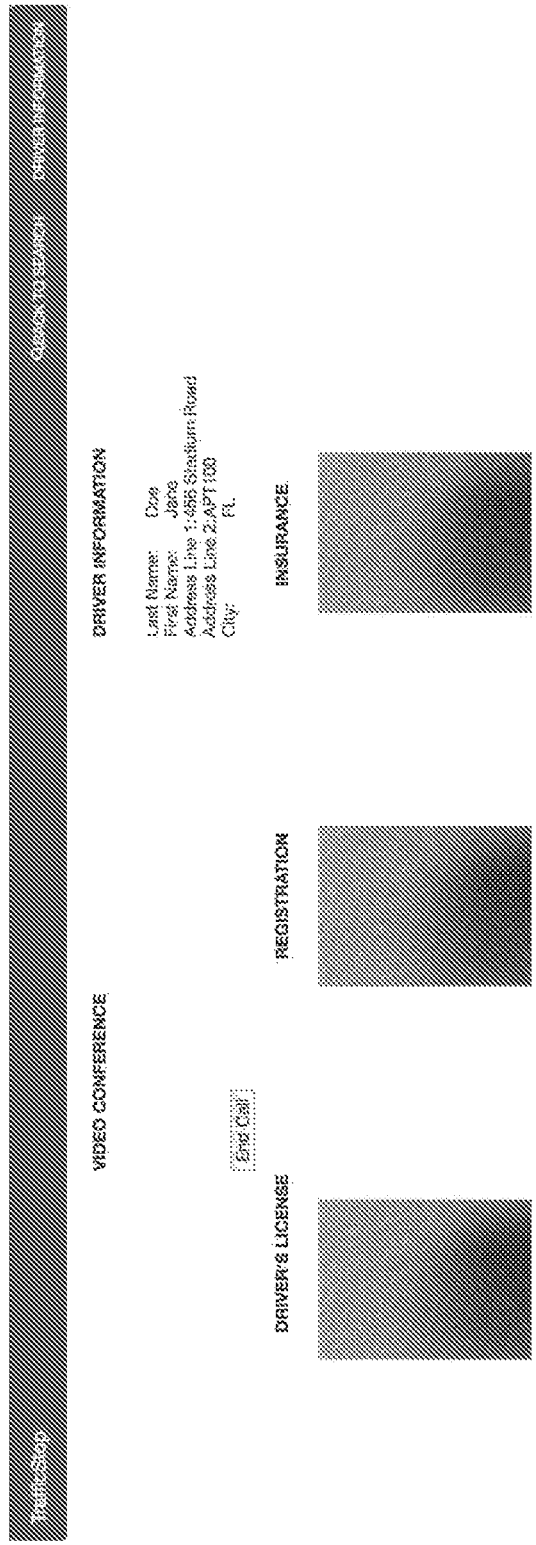

Once the driver information associated with the vehicle plate number is obtained, the apparatus 200 may include means, such as user interface 216, for displaying the driver information on the user interface of the officer device 100. FIG. 8 shows an example driver information screen that visually presents this information. The screen displays the driver's license image information, registration image information, and/or insurance information, and text information included on the driver's license (e.g., driver first and last name, address, etc.).

Figure 9:
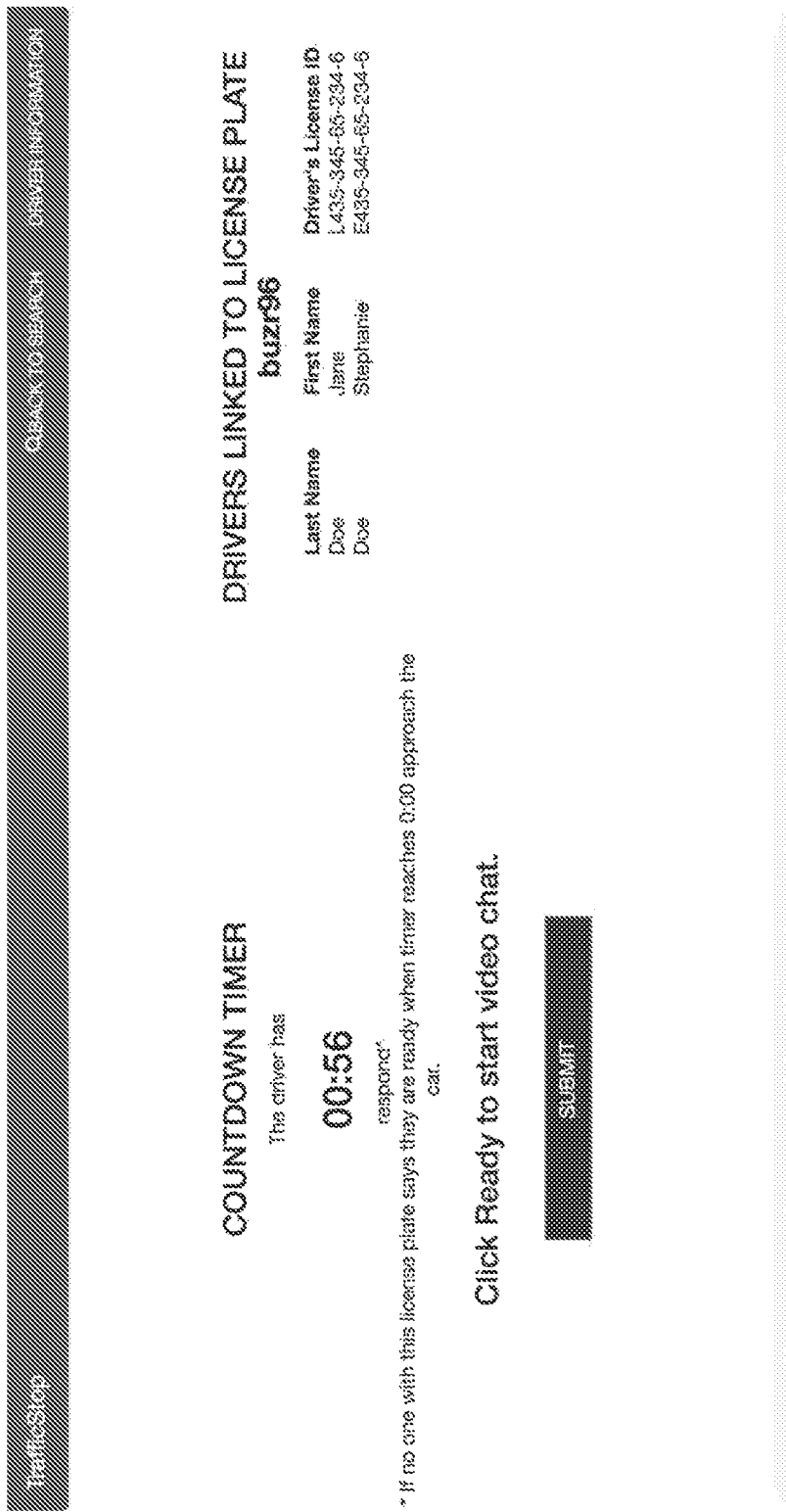
Figure 10:
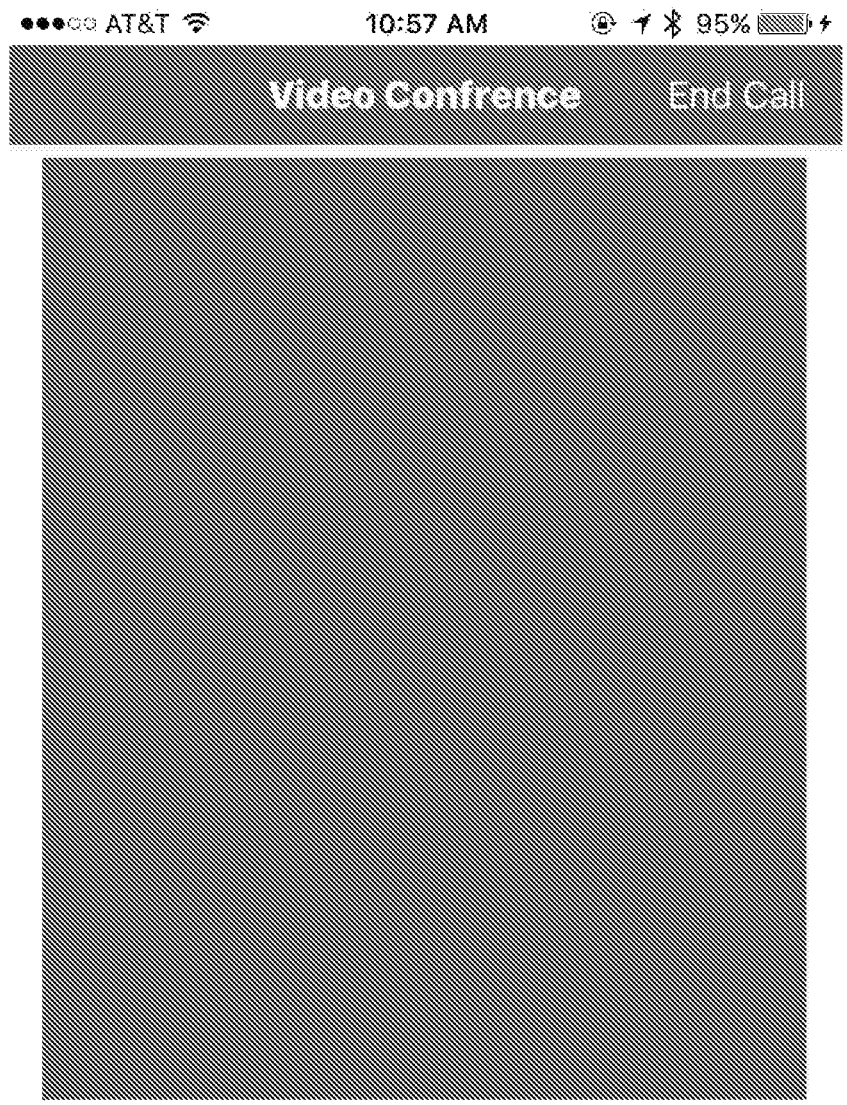

This driver information screen may further provide the capability to establish a virtual connection between the officer device 100 and the driver device 104 over the network 102. In this regard, apparatus 200 may include means, such as communication interface 214, user interface 216, or the like, for transmitting a connection request to the driver device 104 (referred to in FIG. 4 as a Law Enforcement Engagement (LEE) option) (block 408). It will be understood that this connection may comprise a videoconference, a teleconference, or a text chat connection. This operation may, for instance, utilize the network address information received by the officer device 100 from the server device 108. To participate in a video conference, a user associated with the driver device 104 must be properly logged-in to an app stored on the driver device 104 that provides this conferencing capability. In the event that a device receives an invitation to join a video conference but does not have the requisite app installed, an interface of the device may be directed to an installation center which facilitates downloading and installation of the traffic stop app. As shown in FIG. 9, the officer device 100 may receive an indication that the video conferencing call request has been initiated. In some implementations, the indication may include, e.g., pop-up window generated at the officer device 100 and may also include an audio indication, such as ringing. In some implementations, a countdown timer is displayed establishing a time period within which the driver device 104 must respond to the time-critical video conferencing request. If the driver device 104 fails to respond to the request within the response time, the officer device 100 will provide an instruction to the officer to physically approach the vehicle of the driver. In addition to the indication that the video conferencing call request has been initiated, information regarding drivers linked to the license plate number is also caused to be displayed on the traffic stop app. This information includes the first and last name of the driver and the driver's license identification number.

In some implementations, an input may be received by the traffic stop application of the driver device 104 requesting acceptance of the video conference call request initiated by the officer device 100. For example, a pop-up window may include text indicating that the officer may be requesting initiation of a video conferencing session with the driver, as well as the name of the officer, badge identification number of the officer, and the officer's precinct association, all of which can be retrieved by the driver device 104 from the officer device 100 (and which may be verifiable through a separate communication with the server device 108). The driver may either accept the video conference call request or decline the request. When the driver accepts the request, the video conferencing session is launched as depicted in in FIG. 10 and a conferencing connection session is established between the driver and the officer devices (block 410).

It will be understood that a standardized engagement protocol (EP) may be established for handling conferences of this nature. For instance, the EP may be used to train law enforcement officers on how to engage drivers productively. As an example, the officer may be instructed to ask each person in the video conference to identify themselves and their relationship to each other. The officer may request that the driver hit his breaks two or three times to confirm that he or she is the individual driving the vehicle. The officer may ask the driver to maneuver driver device 104 in a sequence that provides a 360-degree view of the interior of the vehicle (in other words, requesting the driver to point the driver device 104 at the back of the vehicle, the passenger side and then the rear window so the officer can see him or herself). During the video conference, the officer may be trained to explain why s/he pulled the driver over and if the driver violated a traffic procedure, the officer may issue a citation without either party having to leave their respective vehicles. These are examples of an EP, although other protocols may be utilized additionally or alternatively.

Figure 11:
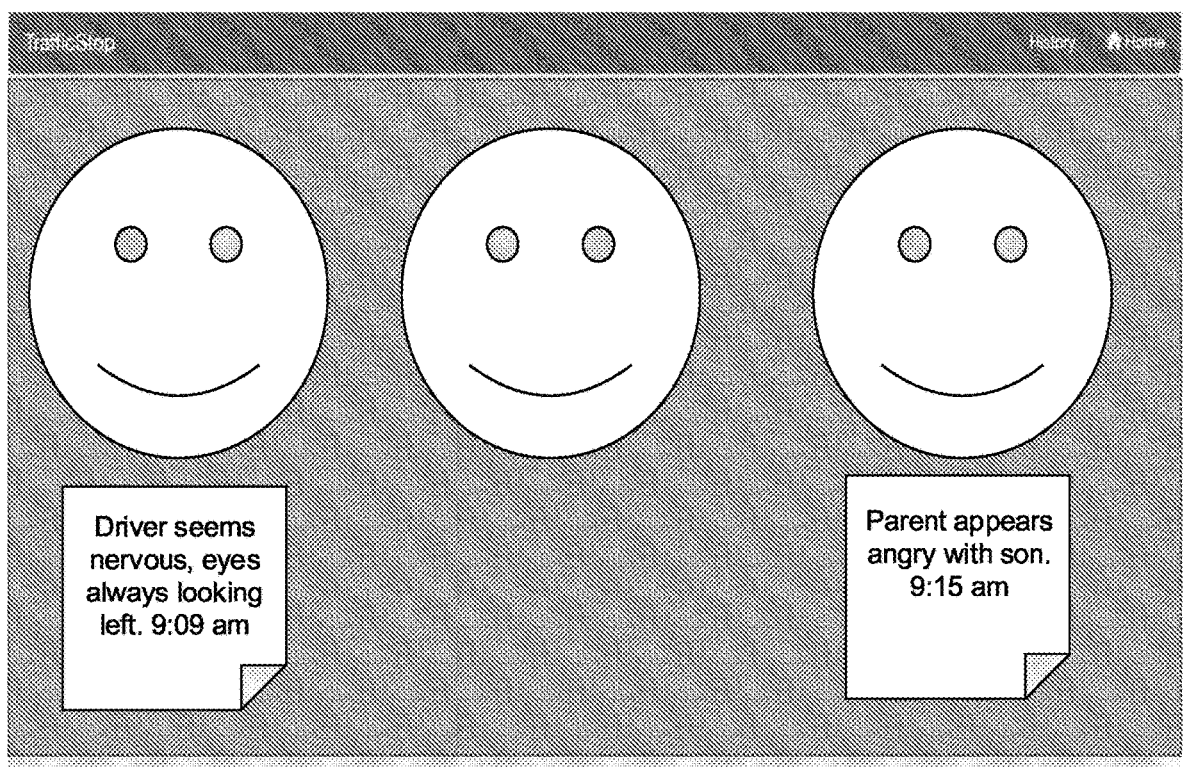

In some embodiments, the communication occurring during the connection may be stored by one or both of the officer device 100 or driver device 104. In some embodiments, server device 108 or database 106 may further be designed for longer-term storage of the audio, video, and/or text comprising the conferencing connection session established between the driver and officer devices, and this data may be uploaded to the server device 108 or database 106 in real-time or in a batch process occurring periodically or when the officer or driver device detects availability of Wi-Fi connectivity. It will be appreciated that in some embodiments, other information associated with the conferencing session can be stored in connection with this data as well. For example, annotations made by the officer during a connection with a driver device (as depicted in FIG. 11) may be captured for storage along with the recorded conferencing connection session.

In some implementations, audio and/or video content captured by the driver and the officer devices may be analyzed either in real-time or at a later time to ascertain cues regarding the physical and emotion state of the driver and/or officer during the interaction. These cues may be gathered by way of facial expression analysis, voice stress analysis, speech analysis, or the like. For example, assuming that a voice stress analysis of the officer's indicates that the officer is angry, the officer device may alert the officer of a heightened emotion state that could conceivably be misinterpreted as threatening by the driver and lead to unwanted escalation of a situation. Conversely, similar stress detected in the voice of the driver may be useful situational awareness information for the officer to possess. In some embodiments, this analysis may take place at a later time and may be used for training purposes. For instance, this information may be used as a comparative tool to identify officers whose demeanor is noticeably outside the ordinary and thus may be more likely to worse outcomes during interactions with civilians.

In some implementations, once the conferencing connection session is established, either the driver or officer may invite other participants to join in via phone or video (block 412). In this regard, the officer or driver may request that a third party join the conference. This request may utilize communications interface 212 of the corresponding device transmitting a request to server device 108, which in turn may query database 106 to identify a third party device 110 associated with the identified individual, and may thereafter either return network address information of the third party device 110 or which may forward the request to the third party device 110. In some embodiments, initiation of the conference may automatically transmit requests to pre-defined third parties. For instance, if the driver is under the age of 18, the driver device 104 may automatically attempt to connect to a third party device 110 associated with a parent or legal guardian of the driver. Alternatively, if the driver has a disability that might prevent communication (e.g., the driver deaf), or does not speak a language in common with the officer (as identified from the user-defined information regarding the driver and the officer stored by database 106), a translator may be automatically requested. In some further embodiments, an attorney may be requested by the driver device 104 or the officer device 100 in a similar fashion. As noted previously FIG. 8 shows an exemplary video conferencing session screen with multiple participants. In circumstances in which there is a language barrier between the officer and driver, either device can be used to transmit a request to server device 108 for an interpreter to join the call to provide an effective means of communication.

The officer device 100 may records several types of data such as the officer's location at the time of a traffic stop, a recording of the communication session between the officer device 100 and driver device 104 (and any other involved devices), citation information, and the captured audio/video via the dash-cam. This data may be automatically parsed and formatted to generate a citation and a report to be sent to the officer's precinct and/or the relevant BMV or other authorities that may have an interest in citation information (block 414).

The server device 108 may manage the records generated by the officer device 100. Also, the server device may provide services for data analysis and trend prediction. In one embodiment, the server device 108 may perform statistical analyses of the data provided by the officer device 100 and data retrieved from the driver device 104 in order to evaluate the effectiveness of the officer interactions with civilians. In at least one embodiment, the server device 108 may use modern data analytics technology to determine and expose outlier officer discrepancies and apparent biases. As the term is used herein, "discrepancy" is defined to include a variety of data types, including but not limited to, past and present actions in response to the standardized engagement protocol (EP), officer patrolling area, traffic stops resulting in a traffic ticket or vehicle search, driver background and any records that are of interest to a supervisor of the officer. In one further embodiment, certain types of discrepancies in behavior reported via officer device 100 would automatically trigger notification of an officer's supervisor.

Figure 12B:
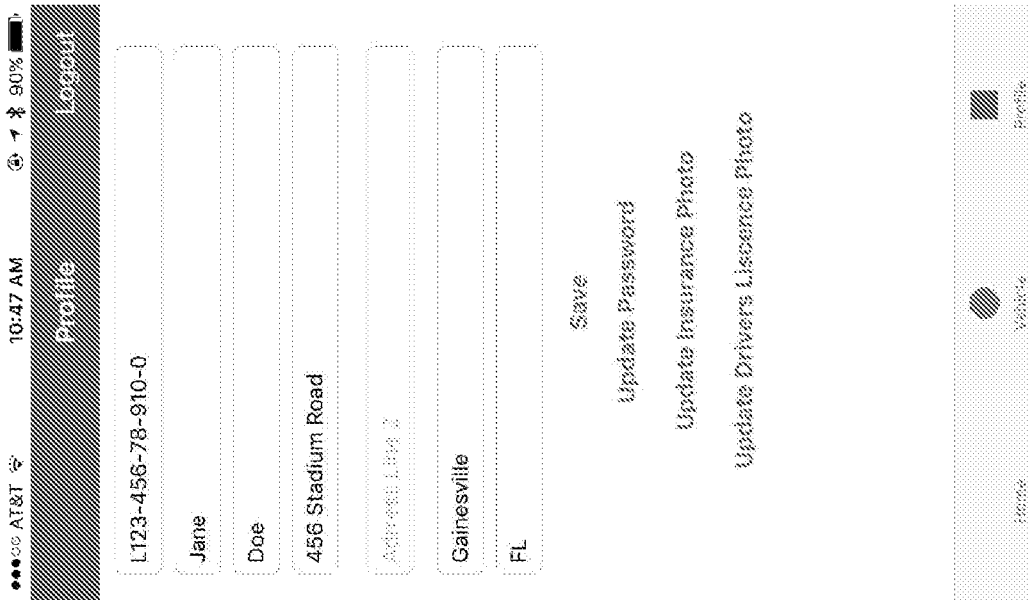
Figure 12A:
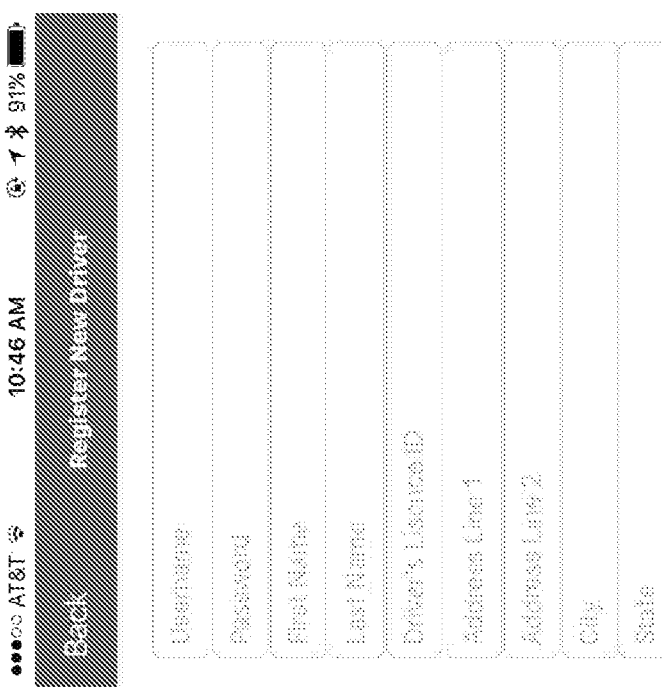

Turning now to FIG. 5, a series of operations are illustrated that may be performed by the driver device 104. In this regard, the driver device 104 may be embodied by an apparatus 200, such as shown in FIG. 2 (and as described in greater detail in FIG. 3). The apparatus 200 may include means, such as a processor 210, memory 214, and/or communication interface 212 for executing the operations described in connection with FIG. 5. In similar fashion as performed by the officer device 100, the driver device 104 may display an interface requesting login information. Upon receipt of login information, the driver device 104 may then deliver the login information to server device 108. The server device 108 then validates the received login information (block 502), either delivering an error message and another opportunity to login, or permitting the driver to access options available to the driver. FIG. 6 shows an exemplary login screen in accordance with block 502. In this example interface, input boxes are available for a username and password, which when entered may be checked against a database (e.g., database 106) accessible to the server device 108 to authenticate the driver. If the server device 108 cannot authenticate the driver, a transmission indicating this fact may be returned to the driver device 104, which in turn may require the driver to either re-enter the login information or generate a new account via a registration process (block 504). Among other purposes, the account may allow the identification of the driver by other devices (e.g., officer device 100, server device 108, or third party devices) in connection with the driver device 104. The registration process may comprise requesting information such as username, password, name, driver's license identification, and address. FIG. 12A shows an exemplary registration screen in accordance with block 504. Once the driver's account is registered, the driver device 104 may be used to update any information associated with the driver's account, such as biographical information, insurance information (including, in some embodiments, a picture of an insurance card), or driver's license information (including, in some embodiments, a picture of a driver's license), as depicted in FIG. 12B.

Figure 13B:
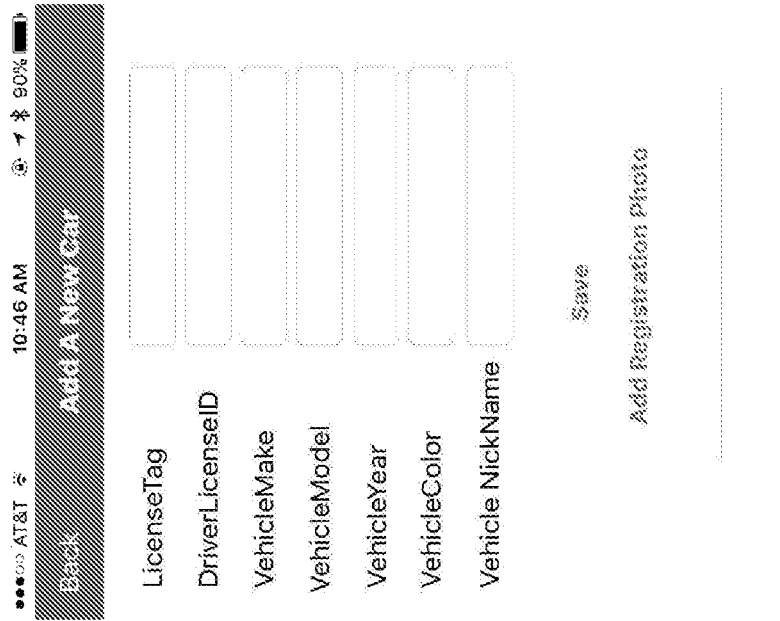
Figure 13A:
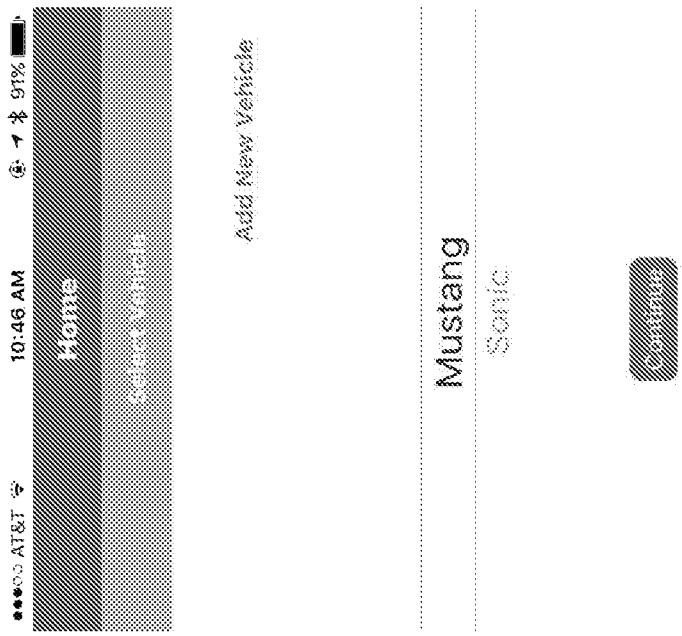
Figure 13A:

Once the driver has successfully logged in, the traffic stop app facilitates an option for the driver to select a vehicle (Block 506). Vehicle selection indicates which vehicle the driver is driving, thus facilitating association of the driver with multiple vehicles. FIG. 13A shows an exemplary vehicle selection screen in accordance with block 506. In embodiments in which a driver account is associated with only a single vehicle, this operation may be unnecessary, as the vehicle used by the driver can be identified by the apparatus 200 even without manual identification. The traffic stop app may also allow the driver to register or update a vehicle (block 508). FIG. 13B shows an exemplary registration screen in accordance with block 508.

In a traffic stop event, the driver may receive a request for a video conference all from a law enforcement officer (block 510). The driver may either accept the video conference call request or decline the request. When the driver accepts the request, the driver device 104 transmits a message to the officer device 100 accepting the connection request. Accordingly, in an instance in which the connection request is for a videoconference, the video conferencing session is launched as depicted in in FIG. 10 and a conferencing connection session is established between the driver and the officer devices (block 514).

In some implementations, before the conferencing connection session is established and upon notification of the request to engage in a video conference session with the officer, friends or family may be notified that the driver is subjected to a traffic stop. In instances when the driver is a minor, notifying the driver's guardians may be necessary. In such cases, the driver may call upon his or her guardian to participate in the video conference call with the officer in accordance with block 516.

Once a connection or conferencing session is established, a status of the driver device 104 and officer device 100 indicating engagement in a traffic stop conferencing session may be delivered to other applications executing on the driver device 104 and/or officer device 100, to deliver status updates regarding the nature and/or expected duration of the interaction. For example, in one embodiment, the driver device 104 may alert a device application called "Waze" (available from Waze Ltd.) of the existence of the traffic incident, thus enabling the Waze application to in turn circulate updated road condition information to other users of the Waze application. In another example, if the officer device 100 calendar status states the officer is to be at an appointment yet the officer is engaged in a traffic stop conferencing session, the traffic stop app may initiate a status update to notify appropriate persons at the appointment of a delay via a communication message application on the officer device 100. Other cascading actions may also be contemplated in various embodiments, such as by providing social network updates and/or other indications of the occurrence of the incident. In this fashion, example embodiments ensure that both parties involved in the encounter are able to focus attention on the encounter itself without distractions that may add stress to the already stressful situation.

As noted above, a traffic stop is always an anxiety-inducing encounter having a degree of risk because one has no idea with whom they will be interacting and what that person's (or people's) intensions are. Example embodiments described herein reduce the anxiety and potential for escalation that has historically been endemic to these encounters. For example, in a traffic stop involving a deaf civilian and an untrained law enforcement officer, the officer, ignorant that the civilian is deaf and with little training to communicate with the deaf civilian, may approach the deaf civilian's car and shine his or her flashlight at the deaf civilian's window. The deaf civilian's immediate reaction may be interpreted as panicking, even though the reaction may be caused not because he or she is concealing anything, but because the bright light from the flashlight prevents the deaf civilian from seeing. Thus, there is loss of effective communication as a result of preventing the deaf civilian's channel of communication. The fear caused one or both parties in situations such as this can lead to unnecessary escalation of the traffic stop from a routine encounter into a violent one. Example embodiments discussed herein thus provide improved tools that can address this scenario by replacing the anxiety-riddled face-to-face interaction with virtual connections such as a videoconference, a teleconference, or a text chat connection between law enforcement officers and civilians who remain in their vehicles. Moreover, assistance from third parties can further smooth the effectiveness of the incident, reducing the likelihood of physical interactions that could end in tragic consequences.

Certain embodiments of the traffic stop app may automatically deliver traffic stop citation information to the calendar module of the driver's device (block 518). In another embodiment, the traffic stop app may also permit the driver to pay any fines associated with the citation directly to the BMV. The traffic stop app records several types of data such as the driver's location at the time of a traffic stop, a recording of the communication session between the officer and driver, and citation information. This data may be automatically parsed and formatted to generate a report to be sent to the BMV (block 520).

It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or enhanced. Furthermore, in some embodiments, additional optional operations may be included. Modifications, additions, or enhancements to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for establishing a communication session between a first computing device, a second computing device, and a third computing device, the method comprising:

presenting, by a first computing device and via a first user interface, an input field for receiving vehicle information, wherein (a) a first user has been authenticated for interaction with the first user interface, and (b) the first computing device is associated with a first vehicle;

receiving, by the first computing device, the vehicle information of a second vehicle during an event, wherein the first vehicle and the second vehicle are proximate one another during the event;

providing, by the first computing device, the vehicle information of the second vehicle, wherein the vehicle information of the second vehicle is used to query a database for connection information associated with a second computing device, and wherein the second computing device is associated with the second vehicle;

receiving, by the first computing device and as a result of the query, (a) the connection information associated with the second computing device, and (b) driver information;

presenting, by the first computing device and via the first user interface, (a) the driver information, and (b) an indicator for initiating a communication session with the second computing device;

responsive to selection of the indicator via the first user interface, initiating, by the first computing device, a communication session request to the second computing device using the connection information, wherein the communication session request is received by the second computing device and presented via a second user interface of the second computing device;
responsive to the communication request being accepted, establishing, by the first computing device, a communication session between the first computing device and the second computing device;
automatically determining whether to join a third party to the communication session based at least in part on (a) a language indication in the driver information, (b) an age indication in the driver information, (c) a physical state or an emotional state detected from the communication session, or (d) a request during the communication session; and
responsive to automatically determining to join a third party to the communication session, initiating, by the first computing device, a communication session request to a third computing device.

2. The method of claim 1, wherein the vehicle information is either received as manual input or automatically captured.

3. The method of claim 1, wherein the vehicle information is automatically captured from a dash-cam attached to the first vehicle or an external camera located along a roadway.

4. The method of claim 1 further comprising:
transmitting, by the first computing device, a broadcast message requesting the vehicle information
receiving, by the first computing device, the vehicle information from a response of the second computing device.

5. The method of claim 1, wherein the database is hosted by a third party device located remotely from both the first computing device and the second computing device.

6. The method of claim 1, wherein the communication session comprises at least one of a video conference, a teleconference, or text chat.

7. The method of claim 1, further comprising:
transmitting, by the first computing device, an invitation for a third computing device to facilitate joining the communication session.

8. The method of claim 1, wherein the event is a law enforcement traffic stop.

9. The method of claim 1, further comprising:
generating a citation associated with the event or a report regarding the event; and
providing the citation or the report for storage on a remote device.

10. A first computing device associated with a first vehicle, the first computing device comprising at least one processor and at least one memory, the memory comprising instructions that, when executed by a processor, configure the first computing device to:
present, via a first user interface, an input field for receiving vehicle information, wherein a first user has been authenticated for interaction with the first user interface;
receive, the vehicle information of a second vehicle during an event, wherein the first vehicle and the second vehicle are proximate one another during the event;
provide the vehicle information of the second vehicle, wherein the vehicle information of the second vehicle is used to query a database for connection information associated with a second computing device, and wherein the second computing device is associated with the second vehicle;
receive, as a result of the query, (a) the connection information associated with the second computing device, and (b) driver information;
present, via the first user interface, (a) the driver information, and (b) an indicator for initiating a communication session with the second computing device;
responsive to selection of the indicator via the first user interface, initiate, a communication session request to the second computing device using the connection information, wherein the communication session request is received by the second computing device and presented via a second user interface of the second computing device;
responsive to the communication request being accepted, establish a communication session between the first computing device and the second computing device;
automatically determine whether to join a third party to the communication session based at least in part on (a) a language indication in the driver information, (b) an age indication in the driver information, (c) a physical state or an emotional state detected from the communication session, or (d) a request during the communication session; and
responsive to automatically determining to join a third party to the communication session, initiate a communication session request to a third computing device.

11. A computer program product comprising a non-transitory computer readable storage medium, the non-transitory computer readable storage medium comprising instructions that, when executed by a first computing device associated with a first vehicle, configure the first computing device to:
present, via a first user interface, an input field for receiving vehicle information, wherein a first user has been authenticated for interaction with the first user interface;
receive, the vehicle information of a second vehicle during an event, wherein the first vehicle and the second vehicle are proximate one another during the event;
provide the vehicle information of the second vehicle, wherein the vehicle information of the second vehicle is used to query a database for connection information associated with a second computing device, and wherein the second computing device is associated with the second vehicle;
receive, as a result of the query, (a) the connection information associated with the second computing device, and (b) driver information;
present, via the first user interface, (a) the driver information, and (b) an indicator for initiating a communication session with the second computing device;
responsive to selection of the indicator via the first user interface, initiate, a communication session request to the second computing device using the connection information, wherein the communication session request is received by the second computing device and presented via a second user interface of the second computing device;
responsive to the communication request being accepted, establish a communication session between the first computing device and the second computing device;
automatically determine whether to join a third party to the communication session based at least in part on (a) a language indication in the driver information, (b) an age indication in the driver information, (c) a physical state or an emotional state detected from the communication session, or (d) a request during the communication session; and responsive to automatically determining to join a third party to the communication session, initiate a communication session request to a third computing device.

12. The method of claim 1 further comprising:
generating log data of the communication session; and
presenting, by the first computing device and via the first user interface, an input field for receiving annotations from the first user.

13. The method of claim 1 further comprising:
automatically determining an emotion based at least in part on at least one of audio data or video data communicated via the communication session.

14. The method of claim 1 further comprising:
automatically updating a map application executing on at least one of the first computing device or the second computing device, wherein the map application executing on the at least one of the first computing device or the second computing device circulates the update to the map application executing on other computing devices, wherein the other computing devices are associated with other users.

* * * * *